Patented Apr. 10, 1951

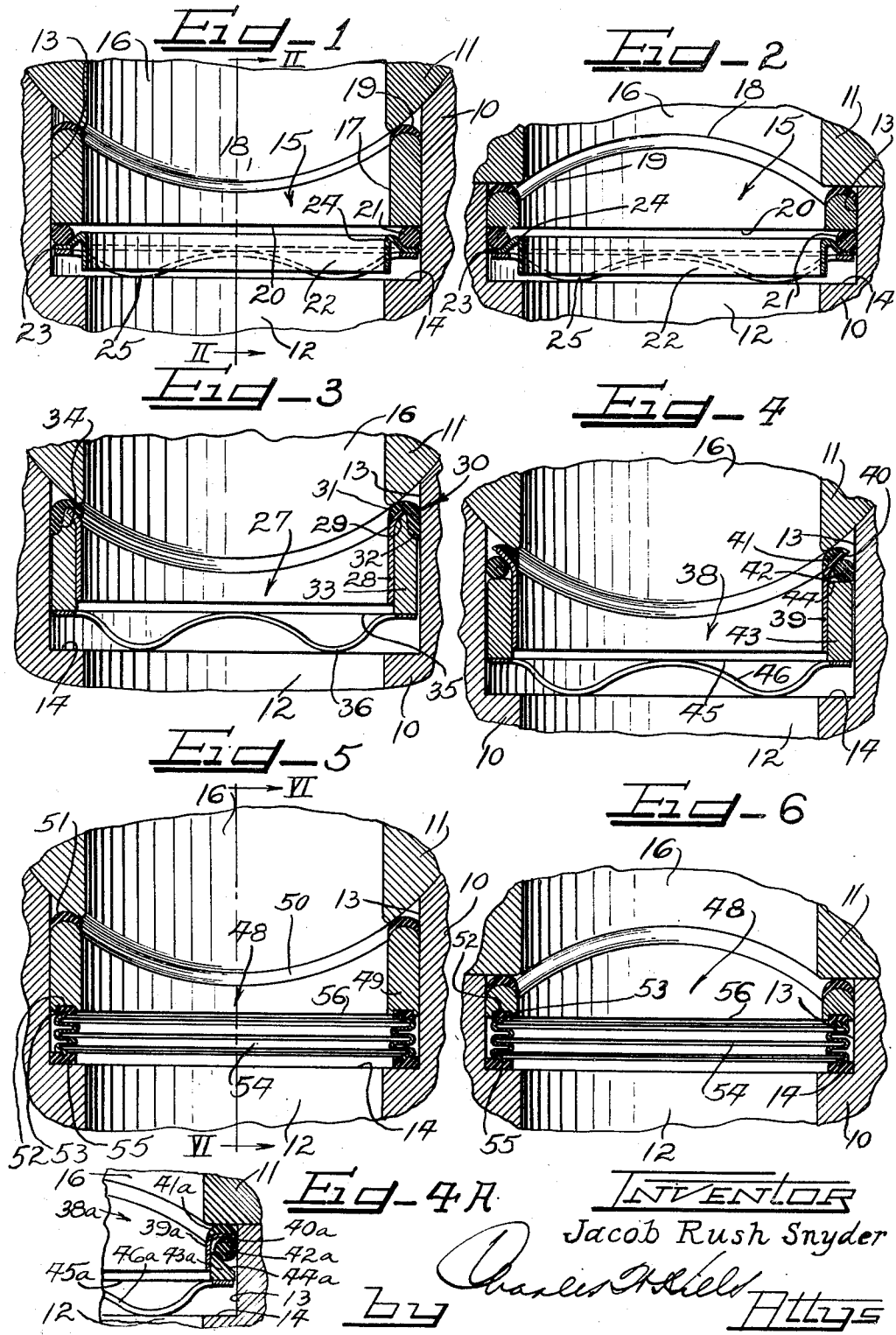

2,548,128

UNITED STATES PATENT OFFICE 2,548,128

SEAL ASSEMBLY FOR FLOW CONTROL DEVICES

Jacob Rush Snyder, Cleveland, Ohio, assignor to Thompson Products, Inc., Cleveland, Ohio, a corporation of Ohio Application May 3, 1944, Serial No. 533,865

3 Claims. (Cl. 251—113)

The present invention relates to improvements in seal assemblies for use in fluid flow control devices and the like.

More particularly, the invention is concerned with a form of seal assembly of a type which may be advantageously employed in selector valves, shut-off cocks, quick disconnect couplings and the like, all of which embody a ported member in which is disposed a shiftable member for opening and closing the ports on the ported member.

In such seal assemblies, it is particularly advantageous to provide a form of resilient seal which will not only provide sealing contact with the shiftable member but also with the wall of the port in the ported member. Thus, seal assemblies are ordinarily adapted to be inserted in each of the ports of the ported member. A suitable biasing means is provided in such assemblies to maintain the several elements thereof in assembled relation and to urge the resilient sealing member at all times into contact with the shiftable member and the wall of the port in which the assembly is disposed. A relatively axially thick resilient synthetic rubber-like compound is customarily employed as the resilient sealing means serving the dual purpose of sealing the shiftable member and the wall of the port.

Such axially thick or deep resilient sealing means have been found deficient in fluid flow control devices such as selector valves, quick disconnect couplings and the like under certain operating conditions. It is desirable, in some instances, to employ hard rubber material for sealing contact with the shiftable member or valve and to back this hard material with more resilient softer material to seal the walls of the port. The rubber composition seals, either of the one-piece thick sectioned type, or of the hard-faced resiliently backed type, are subjected to variable swelling and shrinkage action due to variation in fluid media passed through the control device as well as variations in temperatures and pressures. Selector valves and couplings in aircraft must accommodate such fluids as aromatic fuel and hot oil, which may vary in temperature from —80° F. to 250° F.

It is an object of the present invention, therefore, to provide a seal assembly of such design that excessive swelling and/or shrinkage will not detrimentally affect the sealing qualities of the seal.

A further object of the present invention is to provide a seal assembly employing resilient synthetic compositions of relatively thin cross sections so that swelling and shrinkage variations of 25 to 30% will not defeat the purpose of the seal.

A still further object of the present invention is to provide a seal assembly for ported members which cooperate with shiftable members in which resilient sealing material is protected against shearing action due to the shiftable movement of the shiftable member with respect to the ported member and at the same time provides a highly satisfactory seal without unduly increasing the extent of the torque required to adjust the shiftable member.

Another object of the invention is to provide a thin sectioned resilient seal backed by a hard slidable member.

A still further object of the present invention is to provide a seal assembly which is adapted to be manufactured in large quantities at a minimum cost.

Other and further objects of the invention will be apparent to those skilled in the art from the following detailed description of the annexed sheet of drawings which, by way of preferred example only, illustrates several embodiments of the invention.

On the drawings:

Figure 1 is a fragmentary cross section through a fluid flow control device embodying a shiftable member and a ported member with one form of seal assembly of the type to which the present invention relates inserted in operative relation in one of the ports;

Figure 2 represents a fragmentary cross section taken along the line 2—2 of Figure 1;

Figure 3 is a fragmentary cross section corresponding generally to that of Figure 1 but illustrating a second embodiment of the invention;

Figure 4 is a fragmentary cross section corresponding generally to Figure 1 but illustrating another embodiment of the present invention;

Figure 4A is a fragmentary cross section of a seal construction like the construction shown in Figure 4 but utilizing a bevel-faced retainer.

Figure 5 is a fragmentary cross section corresponding generally to Figure 1, but illustrating still another embodiment of the invention;

Figure 6 is a fragmentary cross section as seen from the line 6—6 in Figure 5.

As shown on the drawings:

In the embodiment of the invention illustrated in Figures 1 and 2, a ported member or casing 10 defines a partly closed chamber in which is disposed a shiftable member or valve 11. The valve 11 is, in this instance, rotatable to open and close the port 12 which is provided with a counterbore 13 adjacent said valve 11. The counterbore 13 defines an abutment or shoulder 14 and receives therein a seal assembly 15 for sealing the internal wall of the counterbore 13 and the face of the valve 11 to sealingly connect passage 16 with port 12 or to seal port 12 with the face of the valve 11.

The seal assembly 15 comprises a rigid retaining means 17 having a shape corresponding generally to that of the cross-sectional configuration of the counterbore 13 in which it is slidably disposed. The retaining means 17 illustrated has one of its ends dished to conform to the peripheral configuration of the valve 11. The dished end face 18 has an arcuate cross section and is provided with a cushion 19 fabricated of a suitable resilient sealing material which is bonded to the arcuate surface of the dished end face 18 of the retaining means 17 for contact with the peripheral surface of the valve 11 to prevent leakage of the fluid being handled by the fluid flow control device with which it is associated between the relatively movable parts thereof.

Immediately adjacent the end face 20 of the retaining means 17 opposite the dished end face 18 is disposed an O ring 21. This O ring 21 is adapted to be formed of a resilient material possessing sealing characteristics and may be fabricated from neoprene, artifical rubber or other suitable plastic compositions. A collar member 22 having an outturned flanged portion 23 extending radially from an inclined fold 24 is provided to urge the O ring 21 against the end face 20 of the retaining means 17 and at the same time exert a radial outwardly directed pressure against O ring 21 to cause it to maintain sealing contact with the wall of the counterbore 13.

It is advantageous to provide a collar member 22 in such installations which has an inner diameter substantially equal to the size of the opening of the port 12 and the passage 16 so as to prevent the presentation of an obstruction to the flow of fluid through the device. The retaining means 17, the O ring 21, and the collar member 22 are maintained in assembled relation in such fashion that the cushion 19 is engaged in sealing contact with the valve 11 and the O ring 21 in sealing contact with the counterbore 13 of the port 12 by means of a spring 25 bottomed on the shoulder 14 of said counterbore. The spring 25 may assume any of several different forms being illustrated as being a ring of spring material having a tortuous configuration.

It will be understood from Figures 1 and 2 of the drawings that the seal assembly 15 may be readily assembled and provides easy replacement of any one or more of the elements in the event that this becomes necessary due to wear, breakage or ineffectual operation. Moreover, the cushion 19 may be fabricated of a material which differs in hardness characteristics from that employed in the fabrication of the O ring 21. This feature makes possible the employment of a material which provides an adequate seal without, however, unduly increasing the extent of the torque required to adjust the valve 11 with respect to the ported member 10 in which it is shiftably mounted.

In each case, the cushion 19 and the O ring 21 provide a relatively thin cross section of the resilient material so that any variation caused by swelling or shrinkage of the material due to wide variations in temperature or other characteristics of the fluid being handled by the flow control device will not appreciably affect the sealing qualities of these elements. The use of a rigid retaining means 17 in the seal assembly 15 virtually eliminates the possibility of sticking or jamming in the counterbore such as may result with a composition packing ring of relatively large cross section. The seal assembly of the present invention also obviates the possibility of inward buckling of the sealing composition.

Moreover, the construction of the seal assembly 15 is such that the cushion 19, which is of relatively thin cross section and bonded or affixed directly to the retaining means 17, is protected against the possibility of shearing or gouging of the material by the edges of the passages 16 of the valve 11 as it is shifted with respect to the ported member 10.

The seal assembly 27 illustrated in Figure 3 of the drawings illustrates another form of assembly which is highly satisfactory in the sealing of the port 12 with respect to the valve 11.

The seal assembly 27 embodies a guide 28 at one end of which, namely that adjacent the valve 11, an outturned lip 29 is formed. The lip 29 of the guide 28 is dished to conform to the peripheral configuration of the generally cylindrically shaped valve 11. The lip 29 has affixed thereto a cushioning element 30 fabricated from neoprene, artificial rubber or other suitable resilient plastic material to provide sealing contact not only with the outer surface of the valve member 11, but also with the wall of the counterbore 13 of the port 12 in the ported member 10.

The cushioning means 30 is provided with a portion which is bonded or otherwise suitably affixed to the inner face of the lip 29 of the guide 28, leaving a free portion 32 overhanging or extending beyond the edge of said lip 29. Mounted telescopically of and projecting beyond the end of the guide 28 is a retaining means 33 of rigid construction. The end of the retaining means 33 adjacent the lip 29 of the guide member 28 conforms generally to the shape of the outer surface of said lip so as to fit snugly thereagainst. An axially extending groove 34 is formed in the outer wall of the retaining means 33 adjacent the lip 29 of the guide 28 to receive in closely fitting relationship the free end portion 32 of the cushioning means 30.

The end face 35 of the retaining means 33 is, as previously indicated, adapted to extend beyond the edge of the guide 28 opposite that at which the lip 29 is formed for engagement with a spring 36. The spring 36 is generally similar to the spring 25 of the seal assembly 15 of Figures 1 and 2 and is adapted to be supported by the abutment or shoulder 14 at the end of the counterbore 13 for contact with the end face 35 of the retaining means 33. In this fashion, the spring 36 is adapted to simultaneously urge the bonded portion 31 of the cushioning means 30 against the outer peripheral surface of the valve 11 and the free portion 32 of said cushioning means 30 against the wall of the counterbore 13. This prevents leakage of fluid being handled by the flow control device with which the sealing assembly 27 is associated between the port 12 of the ported member 10 and the valve 11 in the operation of the device.

The seal assembly 38 illustrated in Figure 4 of the drawing differs slightly from that illustrated in Figure 3 in that, as in the case of the embodiment of Figures 1 and 2, the sealing means is not unitary but embodies instead a pair of cooperating elements. The seal assembly 38 comprises a guide 39 having an outturned lip 40 at one end thereof to the innermost face of which is secured a cushion 41 of suitable plastic sealing composition. As in the case of the lip 29 of the guide 28 forming part of the seal assembly 27 of Figure 3, the lip 40 of the guide 39 is dished or otherwise suitably formed to cooperate with the peripheral surface of the valve 11.

An O ring 42 is inserted in the counter bore 13 immediately adjacent to the outermost face of the lip 40 of the guide 39. A retaining means 43 is fitted about and telescopically mounted with respect to the guide 39 for engaging the O ring 42. It will be understood that the end face 44 of the retaining means 43 engaging the O ring 42 may be flat as shown or may, without departing from the spirit of the invention, be inclined in such fashion that it will cooperate with the inclined outer face of the lip 40 of the guide 39 to urge the O ring 42 outwardly into contact with the wall of the counterbore 13 when the parts are disposed in assembled relation.

As in the previously described embodiment of the invention of Figure 3, the end face 45 opposite the face 44 of the retaining means 43 is adapted to project beyond the edge of the guide 39 opposite that carrying the lip 40. The end face 45 contacts a spring 46, similar to springs 25 and 36 of the previously described embodiments, disposed in contact with the shoulder 14 at the base of the counterbore 13 for urging the retaining means 43 axially of the counterbore 13 and into engagement with the peripheral surface of the valve 11. In so doing, the cushion 41 and the O ring 42 are maintained in sealing relation with the valve member 11 and the counterbore 13, respectively.

The embodiment illustrated in Figure 4A is substantially identical to that of Figure 4. It differs therefrom in that the end face 44a of the retaining means 43a is inclined and is enabled to exert a radial thrust against the O ring 42a. This end face 44a cooperates with the outer face of lip 40a of the guide 39a to effectively seal the wall of the counterbore in which the assembly is disposed.

Another and still further embodiment of the present invention is illustrated in Figures 5 and 6 of the drawing. In this instance, the seal assembly 48 disposed in the counterbore 13 of the ported member 10 for cooperation with the valve 11 is generally similar to the embodiment of Figures 1 and 2. The seal assembly 48 comprises a rigid retaining means 49 mounted for slidable movement axially of the counterbore 13 of the port member 10. The retaining means 49 has a dished end face 50 for cooperation with the peripheral surface of the valve 11.

The retaining means 49 is provided on its dished end face 50 with a cushion 51 of suitable plastic sealing material which is suitably bonded to the arcuately shaped surface of said dished end face 50 for sealing contact with the valve 11. The end face 56 of the retaining means 49 has a channel 52 cut or formed therein which is adapted to receive a sealing means 52 affixed to one end of a spring bellows 54 which may be fabricated in the form of a horizontally corrugated cylinder of springy material, preferably metal. A sealing means 55 is secured to the end of the bellows 54 opposite that to which is affixed the sealing means 53 for sealing contact with the shoulder 14 formed at the base of the counterbore 13 in the port 12 by the ported member 10.

The bellows 54 being seated against the shoulder 14 serves to urge the sealing ring 55, due to its spring-like construction, into sealing contact with the wall of counterbore 13 of the port 12. At the same time, the bellows 54 urges the retaining means 49 and the cushion 51 thereon into sealing contact with the peripheral surface of the valve 11. The seal assembly 48, therefore, provides the cushion 51 and the cooperating seals 53 and 55 which serve to effectively seal the valve 11 and the ported member 10 against the possibility of leakage of fluid therebetween.

It will be apparent from the several disclosures that while the cushioning means 19, 21 and 51 of the several embodiments together with the sealing means 30 are shown as being arcuate in shape and bonded to certain of the elements comprising the several seal assemblies that the cross sections of such sealing cushions may be of any desired shape or thickness without in any way affecting the effective operation of these elements or the flow control device in which the assembly is employed.

The loosely fitting portion 32 of the sealing means 30 associated with the seal assembly 27 of Figure 3, is particularly advantageous for the reason that it affords a relatively free sliding action of the guide and its associated retaining means with respect to the counterbore 13 in which it is disposed, and thus permits a relatively soft synthetic material or rubber to be used. Such material provides a good sealing action with comparatively light spring loads. The reduction in the required spring pressure makes it possible to adjust or shift the valve with respect to its casing with considerably less torque. The seal assemblies of the invention virtually eliminate the possibility of shearing or gouging of the plastic seal material by the relative movement of the valve with respect to the ported member in which it is mounted.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. In a fluid flow control device embodying a ported member and a shiftable member for opening and closing the port in the ported member, a seal assembly for said port comprising a rigid retainer member corresponding in shape to the cross-sectional configuration of the port and slidable therein, a resilient sealing means attached to the end of the retainer proximate to the shiftable member, a second resilient sealing means inserted in said port and disposed adjacent the other end of the retainer member, a flanged member within said port having an outwardly tapered face terminating in an out-turned radial flange, said second sealing means surrounding and supported on said tapered face, said radial flange extending close to the wall of the port and backing up said second sealing means, and a single biasing means concurrently urging the retainer member and its sealing means into sealing engagement with the shiftable member and the flanged member against the second sealing means to radially expand said second sealing means against the port wall and to axially urge the second sealing means against the retainer member while confining said second sealing means against extrusion between the port wall and flanged member.

2. In a fluid flow control device embodying a ported member and a shiftable member for opening and closing the port in the ported member, a seal assembly for said port comprising a rigid annular retaining means slidable in said port and having a dished end face, a resilient sealing material bonded to the dished end face of the retaining means, an annular sealing ring of substantially circular cross-section disposed in said port adjacent the other end of the retaining means, a collar member slidable in said port having an internal diameter corresponding substantially to that of the retaining member and an outwardly tapered side wall terminating in a radially out-turned flange extending into close proximity with the port wall, said annular sealing ring surrounding and supported on said tapered side wall and covered by said radial flange, and a spring for biasing the resilient material covered end face of the retaining means against the shiftable member and for simultaneously biasing the collar against the annular sealing ring to radially expand said annular sealing ring against the wall of the port and to axially urge the annular sealing ring against the retaining means while protecting the ring against deformation between the collar and port wall with the radially extending flange on the collar.

3. In a valve member or the like embodying a ported chamber, said port having a counterbore adjacent the chamber and a valve member in the chamber for opening and closing the port, a seal assembly disposed in the counterbore of said port for sealing engagement with the bore and the valve member, said seal assembly comprising a rigid annular member having an outer diameter corresponding substantially to the inner diameter of the counterbore in which it is slidably mounted, and having an end face thereof of dished configuration, a resilient cushion of sealing material adjacent to the dished end of the annular member, a resilient sealing ring of substantially circular cross-section for engagement with the other end of the annular member, a collar member having an inner diameter corresponding substantially to that of the annular member and having an outwardly tapered face terminating in an out-turned radial flange for respectively radially and axially supporting and engaging the seal ring, said outwardly tapered face being effective for radially expanding the sealing ring against the wall of a counterbore, said radial flange extending into close clearance relation with the counterbore for overlying and confining the sealing ring against extrusion between the collar and counterbore, and a spring seated against the extremity of the counterbore for urging the resilient cushion on the annular member against the valve member and for urging the sealing ring against the annular member and the counterbore to seal both the valve member and the bore.

JACOB RUSH SNYDER.

REFERENCES CITED

The following references are of record in the file of this patent:

UNITED STATES PATENTS

| Number | Name | Date |
|---|---|---|
| 783,953 | Henry | Feb. 28, 1905 |
| 1,049,450 | Caskey | Jan. 7, 1913 |
| 1,062,064 | Ward | May 20, 1913 |
| 1,736,261 | Hallett | Nov. 19, 1929 |
| 1,942,155 | Stevens | Jan. 2, 1934 |
| 1,954,018 | Miller | Apr. 10, 1934 |
| 2,035,548 | Johnson | Mar. 31, 1936 |
| 2,203,989 | Hamer | June 11, 1940 |
| 2,291,563 | Rotter | July 28, 1942 |
| 2,375,633 | Downey | May 8, 1945 |

FOREIGN PATENTS

| Number | Country | Date |
|---|---|---|
| 296,164 | Great Britain | Aug. 30, 1928 |
| 461,446 | Germany | June 22, 1928 |
| 805,137 | France | Aug. 17, 1936 |